(12) United States Patent
Rand Mcfadden et al.

(10) Patent No.: US 7,698,602 B2
(45) Date of Patent: Apr. 13, 2010

(54) SYSTEMS, METHODS AND COMPUTER PRODUCTS FOR TRACE CAPABILITY PER WORK UNIT

(75) Inventors: Renata Rand Mcfadden, Clinton Corners, NY (US); David A. Wise, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 11/762,136

(22) Filed: Jun. 13, 2007

(65) Prior Publication Data

US 2008/0313502 A1 Dec. 18, 2008

(51) Int. Cl.
G06F 11/00 (2006.01)
(52) U.S. Cl. ......................................... 714/45; 717/128
(58) Field of Classification Search .................... 714/45; 718/128
See application file for complete search history.

(56) References Cited

U.S. PATENT DOCUMENTS 6,732,307 B1 * 5/2004 Edwards ..................... 714/724
7,043,668 B1 * 5/2006 Treue et al. .................... 714/45
7,574,626 B2 * 8/2009 Nemoto ........................ 714/38

OTHER PUBLICATIONS

IBM; "Trace Capability Per Work Unit" [online]: [retrieved on Apr. 16, 2007], retrieved from the Internet http://priorart.ip.com/viewPub.jsp?pubID=IPCOM000137435D&ipcomAffiliate=.

* cited by examiner

Primary Examiner—Christopher S McCarthy
(74) Attorney, Agent, or Firm—Cantor Colburn LLP; William A. Kinnaman, Jr.

(57) ABSTRACT

A set of trace data are generated for full tracing in private memory on a work unit basis. Generating the set of trace data includes source code having trace statements, where trace data based on the work unit includes either an identifier or a layer to establish a start and an end of the work unit, where either the identifier or the layer is specific to an application. Each trace data entry in the set of trace data created while executing a work unit contains a selection field to enable selecting which entries are transferred to the shared trace table from the private memory, when a work unit completes.

6 Claims, 2 Drawing Sheets

SYSTEMS, METHODS AND COMPUTER PRODUCTS FOR TRACE CAPABILITY PER WORK UNIT

TRADEMARKS

IBM® and z/OS® are registered trademarks of the International Business Machines Corporation, Armonk, N.Y., U.S.A. Other names used herein may be trademarks and registered trademarks, or trade or product names of International Business Machines corporation or other companies. For example, UNIX® is a registered trademark of The Open Group.

TECHNICAL FIELD

This invention relates generally to computer and processor architecture. More particularly, this invention relates to component trace as a first failure data capture debugging operation and applies to a service provider application that accepts many work units from a distributed client or calling application. This invention can be applied to any system running any service provider application.

BACKGROUND

Known implementations of multi-threaded applications collect trace data in a shared trace table to support first failure data capture (FFDC) for problem analysis and debugging. In general, some sort of filtering is implemented, but trace data is generated for everything continuously. Most traces can be filtered on input by setting classes/levels or trace table size and filtered on output by extracting a subset of data, or both. The problem with those methods is that either too little or too much data is collected. When a large number of trace points are enabled, the shared trace wraps in a short period, thus losing crucial data. When too few traces are enabled, there is insufficient documentation for first failure data capture. Another variation of the problem is evident in the event of a hung work unit or hung work units, where the private trace tables contain the full trace information indefinitely; the trace data will never be over-written by other threads. These problems require users to recreate failing scenarios with additional traces enabled and potentially with special versions of programs with additional traps or traces. The growing power and workload managed by servers greatly increases the extent of dais problem. As systems contain larger numbers of CPU's, the snared trace table causes performance degradation due to memory cache contention. The use of very large trace tables or continuously off-loading the trace data to external media, simply defers the problem because eventually the size of trace data must be limited. Extremely large amounts of trace data also create a management problem when transmitting data to a service center, formatting, and analyzing the trace information. Output filtering methods do not reduce the amount of data generated, just the final step of analysis. A new solution is required to enhance first failure data capture capability such that more trace data can be continuously generated while less data is written out into the shared trace table. This problem has been observed in many service provider applications where a long running application accepts many work units from another layer in the same system or across the network. This problem has been observed in various components of enterprise operating system environments, which rely on clusters of servers, when looking at customer and system test problems. However, this problem is not limited to the above mentioned applications and it is not limited to IBM network applications. Other applications and vendors are similarly affected.

Therefore, the need exists for a method of creating and preserving maximum trace data for every work unit until the work unit is complete, while minimizing the trace data for successfully completed work units.

Further, the need exists for a method to reduce memory cache contentions, which degrade server workload performance.

SUMMARY OF THE INVENTION

A method and system for generating full tracing in private memory on a work unit basis of a set of trace data are disclosed, where the private memory includes a plurality of private trace tables. Generating the set of trace data includes source code having trace statements, where trace data, based on the work unit, includes either an identifier or a layer to establish a start and an end of the work unit, where either the identifier or the layer is specific to an application. The individual work unit keeps track of all the trace data as it executes. This set of trace data is considered local to the work unit. Each trace data entry in the set of trace data created while executing a work unit contains a selection field to enable selecting which entries are transferred to the shared trace table when a work unit completes. The selection field may be a numerical value or a bit mask which, will be compared to a unit of work completion value or a bit mask. In the simplest method, a single bit may be used to indicate whether trace entries are to be transferred to the shared table for successful work units. With additional bits forming a numerical value or mask, it is possible for more variations on the selection criteria, according to specific completion error classes or values. Thus, using both a private memory and a shared trace table reduces memory cache contention.

Next, it is determined whether the work unit was successful. If it is determined that the work unit was successful, then the operation selectively moves a subset of the generated set of local trace data to a shared trace table by writing minimal trace data to the shared trace table.

In the event that it is determined that the work unit was not successful and that either errors or unusual conditions and/or hung work units were encountered, the private trace tables contain the full trace information indefinitely; the trace data will never by over-written by other threads.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, which are meant to be exemplary, and not limiting, wherein:

DETAILED DESCRIPTION

Figure 1:
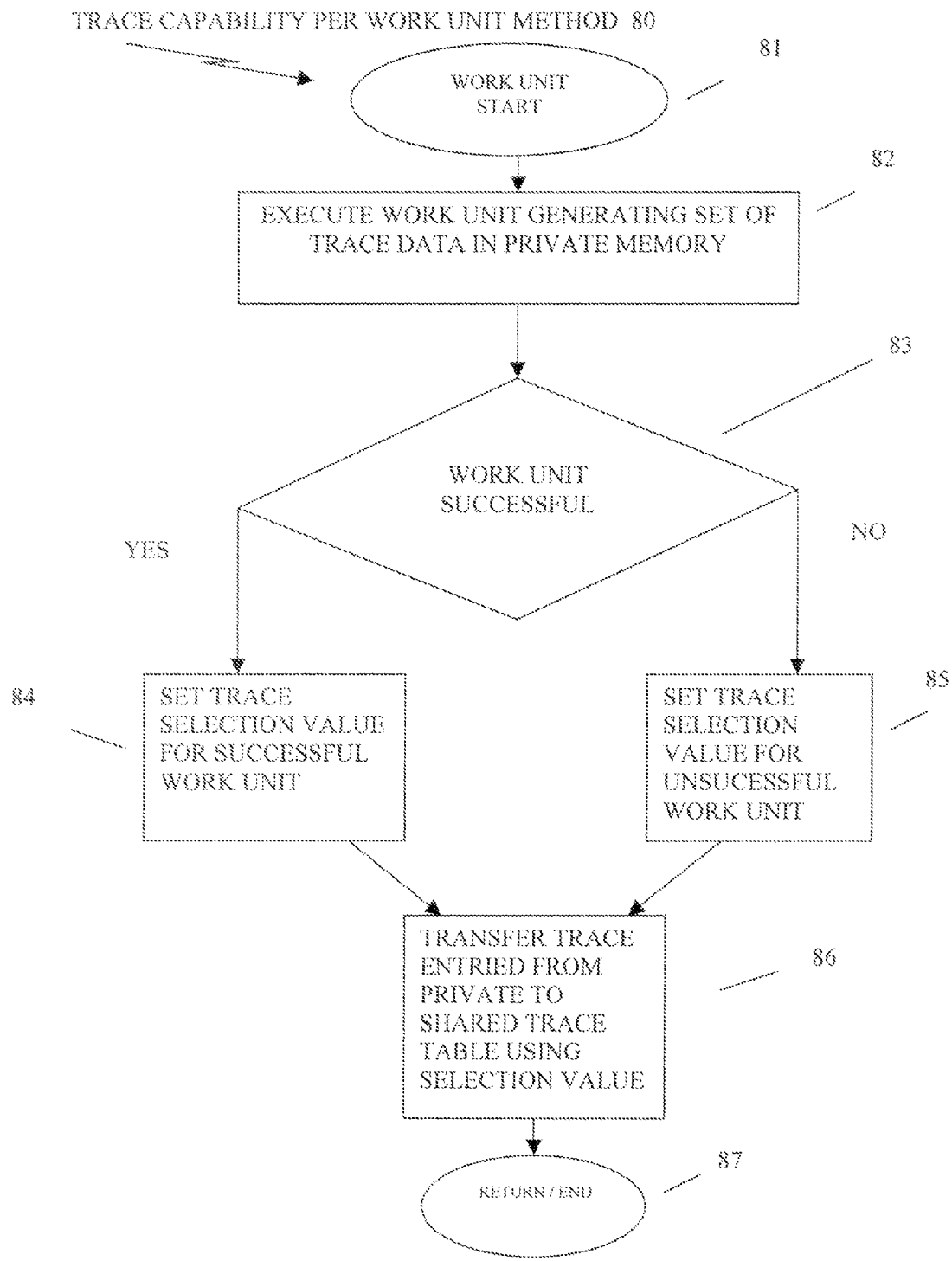
FIG. 1 illustrates operations in a method for generating full tracing in private memory on a work unit basis.

Exemplary embodiments of network trace capability per work unit first failure data capture, network component debugging method and system are described in detail below. The exemplary embodiments disclosed herein relate to component trace as a first failure data capture debugging operation and applicable to any service provider application that accepts many work units from a distributed client or a callable service work unit. A mainframe operating system management and integration network environment represents an example of such exemplary embodiments and a distributed client work unit is typically defined through a messaging interlace delivered through a network or messaging service; a callable service work unit is delivered through an application programming interlace. The disclosed exemplary embodiments are intended to be illustrative only, since numerous modifications and variations therein will be apparent to those of ordinary skill in the art. In reference to the drawings, like numbers will indicate like parts continuously throughout the view. The exemplary embodiments disclosed herein, address problems in component debugging of service provider applications such as distributed file system (DFS)/server message block (SMB) Servers, UNIX System Services (USS), the z Series File System (zFS) which is a UNIX file system, and TCP/IP components in the IBM enterprise operating system environment. However, the disclosed exemplary embodiments can be applied to any system running any service provider application. Further, the terms "a", "an", "first", "second" and "third" herein do not denote limitations of quantity, but rather denote the presence of one or more of the referenced item(s).

Network servers and callable internal services for servers each have some definition of their respective units of work (herein referred to as "work unit"). For each type of server from a plurality of types of servers, there is a particular type of function that defines the servers work unit.

In SMB server message block network servers, the work unit is a message received. In a typical file system, such as zFS (i.e., the z series file system), the work unit is a file system operation. A web server work unit is a single http server request. An FTP (file transfer protocol) server work unit is an FTP operation request; and a telnet server work unit would be defined by the receipt of a telnet request, which would be a session request or a read/write function that would define the telnet server work unit. Thus, generically, a server is sitting on a network waiting to receive service requests or waiting to be called. Therefore, either over a network or callable from an application programming interface, a server performs some work (i.e., a defined work unit), which is a function of a service request message. If the service request message is transmitted over the network, then a response message is transmitted back over the network, thus ending the work unit. If the service request message is callable through an application programming interface, then the application programming interface returns a response message to the caller and this return operation signals the end of the work unit.

At the ending of the work unit, i.e., when the response message is returned, the completion status of the work unit can be determined in the method and system of the exemplary embodiments whether the work unit function is successful or not. And, even if the work unit is successful, there may be some exception trace data that has been recorded. This determination can be used to define what amount of trace data is transferred to the shared trace data table.

Figure 2:
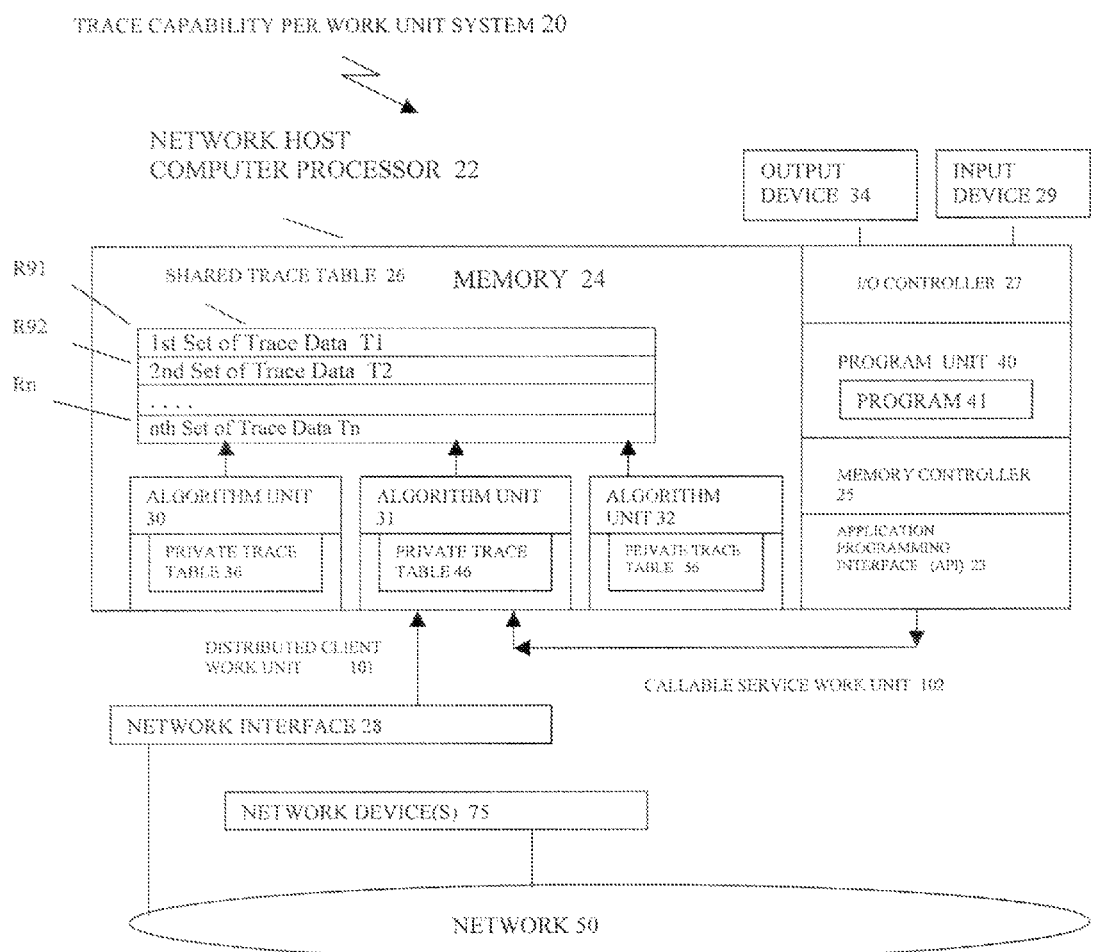
FIG. 2 illustrates the system implementing the operations illustrated in FIG. 1.

Referring to FIGS. 1 and 2, a method and system are illustrated for generating, from service provider applications, full tracing of a set of trace data in private memory on a work unit basis. In the exemplary embodiments, private memory can be composed of a plurality of trace fables, illustrated as private trace tables 36, 46 and 56 in FIG. 2. Generating the set of trace data includes generating source code having trace statements. Trace data, based on a work unit, includes either an identifier or a layer to establish a start and an end of the work unit. The identifier or the layer is specific to an application. FIG. 1 illustrates trace capability per work unit method 80 (herein referred to as "method 80"). FIG. 2 illustrates a trace capability per work unit system 20 (herein referred to as "system 20").

Referring to FIG. 2, the system 20 is composed of network host computer processor 22, which is cooperatively coupled to network device(s) 75 over network 50, via network interface 28. Network host computer processor 22 contains memory 24, where shared trace table 26 resides. Shared trace table 26 may be considered a permanent trace table and contains a plurality of table entry locations R91, R92 through Rn, where "n" is a maximum number of table entry locations, based on the physical capacity of shared trace table 26. Network host computer processor 22 is cooperatively coupled to a plurality of private trace tables illustrated in FIG. 2 as private trace table 36, private trace table 46 and private trace table 56, via memory controller 25. In the exemplary embodiments, the characterization of the shared trace table 26 as permanent means that the shared trace table 26 can maintain a large amount of trace data for a long-term period of time. This is contrasted with a relatively small amount of work unit trace data recorded per work unit in a plurality of private trace tables, i.e., private trace tables 36, 46 and 56. Furthermore, the large amount of trace data contained in shared trace table 26 is typically composed of the private trace data generated from a plurality of work unit transactions. The plurality of table entry locations R91, R92 through Rn holds a plurality of sets of work unit trace data (i.e., 1st set of trace data T1 2nd set of trace data T2 through an mth set of trace data Tm, where "m" is the maximum number of trace data that can be stored in the table entry locations R91, R92 through Rn. Also, residing in network host computer processor 22 is a combination of controllers, which includes display controller 23, memory controller 25 and I/O controller 27. Network host computer processor 22 is also cooperatively coupled to a combination of other computer peripheral devices including output device 34 and input device 29. Network host computer processor 22 contains at least one callable application programming interlace (API) 23. In addition, network host computer processor 22 contains program unit 40 and a plurality of algorithm units, illustrated in FIG. 2 as algorithm unit 30, algorithm unit 31 and algorithm unit 32, where algorithm unit 30 contains the private trace table 36, algorithm unit 32 contains the private trace table 46 and algorithm unit 32 contains the private trace table 56. Program 41 resides in program unit 40. Program 41 is an article of manufacture made up of computer executable program code including source code stored on computer executable media. Program 41 in performing the operations of method 80, calls algorithms from algorithm units 30, 31 and 32 to assign trace data to private trace tables 36, 46 and 56, as well as shared trace table 26.

Referring to FIGS. 1 and 2, trace capability per work unit method 80 is initiated at operation work unit start 81, when program 41 is executed by network host computer processor 22. As the work unit executes (i.e., either transmitted via the network interlace 28 or callable via API 23) in operation execute work unit generating set of trace data in private memory 82, program 41 running on computer processor 22 keeps track of all trace data for each work unit that is executing, because it does not know yet whether the work unit will be successful. When a response message is transmitted back over the network interlace 28 or returned to the caller from API 23, the end point of the work unit is reached (i.e., indicates a work unit completes), and it can be determined if the work unit is successful or not. Thus, program 41 running on computer processor 22 keeps track of all of the trace data for each of a plurality of work units executing, where all of the trace data per work unit are recorded in each of a respective private trace table of a plurality of private trace tables illustrated as private trace tables 36, 46 and 56. These private trace tables can be considered local trace tables. Each trace data entry in the set of trace data created while executing a work unit contains a selection field to enable selecting which entries are transferred to the shared trace table when a work, unit completes. The selection field may be a numerical value or a bit mask which, will be compared to a unit of work completion value or a bit mask. In the simplest method, a single bit may be used to indicate whether trace entries are to be transferred to the shared table for successful work units. With additional bits forming a numerical value or mask, it is possible for more variations on the selection criteria, according to specific completion error classes or values. For work unit message success, only the minimal trace data are selectively taken out of the private trace tables 36, 46 and 56 and put into the more permanent shared trace table 26. For work unit message failure and/or exceptions, all work unit trace data are written to shared trace table 26. The shared trace table 26 can be stored locally in memory 24 or it can be written out to a hard drive memory device, based on application needs. Thus, shared trace table 26 can be considered more of a permanent trace table. At operation execute work unit generating set of trace data in private memory 82, a full set of trace data is generated from work unit messages (for example, server message blocks may contain work unit messages) is written to shared trace table 26 in memory 24. A plurality of trace data are written to the plurality of table entry locations R1, R2 through Rn of shared trace table 26. Generating the sets of trace data per work unit, involves source code having trace statements. The trace data are based on work units, where the work units include either an identifier or a layer to establish a start and end of the work unit, and where either the identifier and/or the layer is specific to an application running on network 50 or callable by API 23 and managed by network host computer processor 22.

Next, at operation work unit successful 83, the logic of program 41 determines whether the received work unit message and/or function associated with the send work unit message and/or function was successful; thus, giving an indication as to whether or not the work unit was successful. If, in operation work unit successful 83, it is determined that the work unit was successful (YES), then at operation 84, program 41 calls an algorithm from the plurality of algorithms to cause network host computer processor 22 to set a trace selection value for the condition where the work unit is successful (i.e., work unit successful YES). Thus, at operation transfer trace entries from private to shared trace table using selection value 87, program 41 causes the network host computer processor 22 to selectively transfer a subset of the generated set of trace data form one of the plurality of private trace tables 36, 46 or 56 to shared trace table 26, by writing minimal trace data to the shared trace table 26.

Also, in the exemplary embodiments, at operation work unit successful 83, if it is determined that the work unit was not successful (NO), i.e., that either errors, exceptional or unusual conditions and/or hung work units are encountered, the private trace tables contain the full trace information indefinitely; the trace data will never be over-written by other threads, then at operation 85, and where any of the plurality of algorithms called by program 41 to perform the operations of method 80 create verbose trace output for each work unit and causes processor 22 to set a trace selection value for the condition where the work unit is unsuccessful (i.e., work unit successful NO). Thus, at operation transfer trace entries from private to shared trace table using selection value 87, program 41 causes the network host computer processor 22 to selectively transfer a full set of work unit trace data from private trace table 36, private trace table 46 and/or private trace table 56 to shared trace table 26. At operation return/end 87, method 80 either returns to operation execute work unit generating set of trace data in private memory 82 or when all possible trace data is generated and processed, then method 80 ends.

By transferring only a subset of the generated set of trace data to the shared trace table 26, due to normal work unit execution, the useful, tangible and concrete results of storing minimal data in the shared trace table 26 is achieved, resulting in reduced data required to be maintained in shared trace table 26, which leads to the further useful, tangible and concrete result of increasing a period of time before the trace data wraps in the snared trace table 26 and data is lost for ever. Therefore, first failure data capture of trace data for problem analysis and debugging is improved. Furthermore, writing a full set of trace data for each work unit of the plurality of work units to private trace table 36, private trace table 46 and private trace table 56, preserves maximum trace data in private trace tables 36-56 for either unusual or hung work units, where available trace data for in-flight and abnormal conditions are increased. Further, using both a private memory, i.e., private trace tables and a shared trace table reduces memory cache contention. Thus, separating trace tables into two levels, i.e., a private trace table level and a shared trace table level provides the aforementioned useful, tangible and concrete results.

Also, in the exemplary embodiments, when the determination is made as to whether or not the work unit is successful, program 40 obtains information about the completion status of the work unit, i.e., what happened during the execution of the work unit. So, after the execution of the work unit, knowledge of any exceptional conditions or error conditions, as well as any hung work units found in the completion status of the work unit can be used as further intelligent filtering through trace data to provide the useful, concrete and tangible results of determining what amount of the trace data should be kept in the longer term shared trace table and of allowing an operator to use that data to analyze and debug problems in the system.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method for generating full tracing in a private memory on a work unit basis, the method comprising:
    generating a set of trace data in the private memory, wherein generating the set of trace data includes source code having trace statements, wherein trace data based on the work unit includes one of an identifier and a layer to establish a start and an end of the work unit, wherein one of the identifier and the layer is specific to an application, and wherein the private memory includes a plurality of private trace tables;

determining whether the work unit was successful; and selectively transferring, using a selection value, a subset of the set of trace data of the work unit to a shared trace table by one of writing minimal trace data to the shared trace table, if it is determined that the work unit was successful and writing a full set of trace data of the work unit to the shared trace table, if it is determined that one of errors, unusual conditions and hung work units occurred, wherein data collected in the shared trace table is reduced and a time period before trace data wraps is increased, wherein the subset of the set of trace data includes trace entries created while executing the work unit, wherein each trace entry created while executing the work unit contains a selection field for selecting which entries are transferred to the shared trace table, when the work unit completes, wherein the selection field is one of a numerical value and a bit mask, which will be compared to a work unit completion value, and wherein using the private memory and the shared trace table reduces memory cache contention.

2. The method according to claim 1, wherein the trace data generated in the private memory results in increasing available trace data for in-flight and abnormal conditions.

3. The method according to claim 2, wherein selectively transferring the subset of the set of trace data further results in improving first failure data capture for problem analysis and debugging.

4. A system for generating full tracing in a private memory on a work unit basis, the system comprising:

a network host computer processor containing a plurality of units including a program unit and an algorithm unit, wherein the network host computer processor is cooperatively coupled to a plurality of network computers and servers over a network;

a computer executable program residing in the program unit, wherein the computer executable program when executed by the network host computer processor causes the network host computer processor to:

generate, in a generating operation, a set of trace data in the private memory, wherein generating the set of trace data includes source code having trace statements, wherein trace data, based on the work unit, includes one of an identifier and a layer to establish a start and an end of the work unit, wherein one of the identifier and the layer is specific to an application, and wherein the private memory includes a plurality of private trace tables;

determine, in a determining operation, whether the work unit was successful; and selectively transfer, in a transferring operation, a subset of the set of trace data of the work unit to a shared trace table by one of writing minimal trace data to the shared trace table, if it is determined that the work unit was successful and writing a lull set of trace data of the work unit to the shared trace table, if it is determined that one of errors, unusual conditions and hung work units occurred, wherein the shared trace table is a permanent trace table, wherein data collected in the shared trace table is reduced and a time period before trace data wraps is increased, wherein the subset of the set of trace data includes trace entries created while executing the work unit, wherein each trace entry created while executing the work unit contains a selection field for selecting which entries are transferred to the shared trace table, when the work unit completes, wherein the selection field is one of a numerical value and a bit mask, which will be compared to a work unit completion value, and wherein using the private memory and the shared trace table reduces memory cache contention.

5. The system according to claim 4, wherein the trace data generated in the private memory results in increasing available trace data for in-flight and abnormal conditions.

6. The system according to claim 5, wherein the transferring operation of the subset of the set of trace data further results in improving first failure data capture for problem analysis and debugging.

* * * * *